United States Patent [19]

Spence

[11] 4,289,214
[45] Sep. 15, 1981

[54] MULTI-PURPOSE VEHICLE

[76] Inventor: William G. Spence, Airport Rd., Mansonville, Quebec, Canada, J0E 1X0

[21] Appl. No.: 892,974

[22] Filed: Apr. 3, 1978

[30] Foreign Application Priority Data

Jan. 28, 1978 [GB] United Kingdom ............... 03579/78

[51] Int. Cl.³ .......................... B60K 17/30; B60D 1/16
[52] U.S. Cl. ................................. 180/234; 180/70 R; 180/271; 180/900; 180/311; 280/781; 280/91; 280/493; 114/270
[58] Field of Search ........... 280/405 R, 405 A, 405 B, 280/406 R, 406, A, 407, 446 R, 446 A, 492, 493, 494, 496; 180/234, 900

[56] References Cited

U.S. PATENT DOCUMENTS

| | | | |
|---|---|---|---|
| 901,701 | 10/1908 | Gerling | 280/407 |
| 2,354,250 | 7/1944 | Evans | 280/496 X |
| 2,404,925 | 7/1946 | Sauer | 280/407 |
| 2,702,438 | 2/1955 | Ballu | 180/1 F |
| 2,796,140 | 6/1957 | Knolle | 180/1 F |
| 2,994,392 | 8/1961 | Kosman | 180/45 |
| 3,010,735 | 11/1961 | Larsen | 280/405 B |
| 3,062,561 | 11/1962 | Wulff | 280/405 B |

FOREIGN PATENT DOCUMENTS

| | | | |
|---|---|---|---|
| 353603 | 5/1922 | Fed. Rep. of Germany | 280/496 |
| 954041 | 12/1949 | France | 280/494 |
| 1213242 | 3/1960 | France | 280/405 B |

Primary Examiner—John P. Silverstrim
Attorney, Agent, or Firm—Donald E. Degling

[57] ABSTRACT

A multi-purpose four-wheel drive vehicle having four-wheel steering. The vehicle according to the present invention incorporates a number of features, some of which are individually known in the prior art but which, when combined in a single vehicle, constitute a vehicle having several advantages over conventional vehicles presently employed for various uses. The applicant's multi-purpose vehicle is of light-weight construction, is relatively inexpensive to manufacture in comparison with vehicles presently employed for the same jobs as those accomplished by the present vehicle, and has substantially less initial and operating costs. The applicant's vehicle incorporates a relatively high ground clearance which is achieved by employing four vertical axles and wheels situated at the four corners of a main frame body of the vehicle. The vertical axles are situated in respective spaced-apart leg post members, each leg post member being rigidly interconnected by two spaced-apart longitudinally extending frame members and two spaced-apart transversely extending frame members. At least three of the frame members are of torsionally resilient construction. When a weight is suspended mid-point between the front and rear wheels of the vehicle, this weight may be transferred by the vehicle without traction loss due to the increased load in that true traction is increased as the load increases.

20 Claims, 26 Drawing Figures

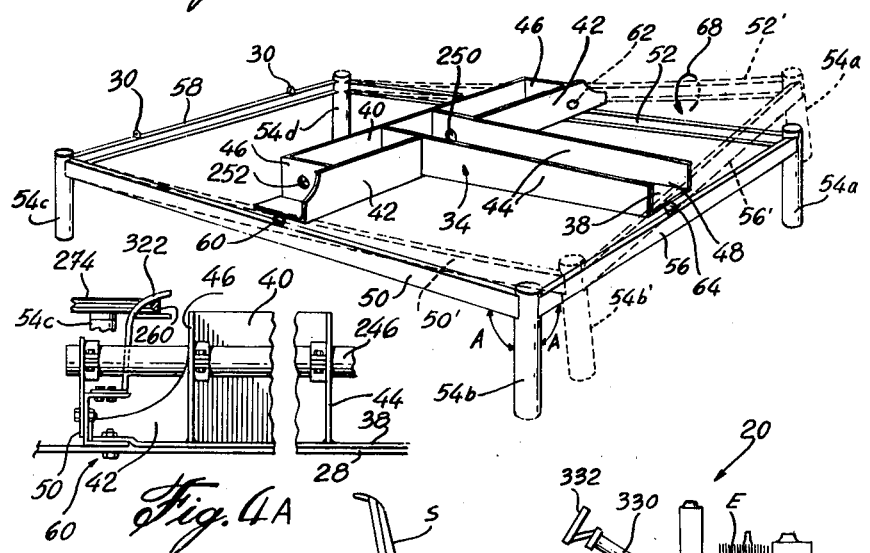
Fig. 1
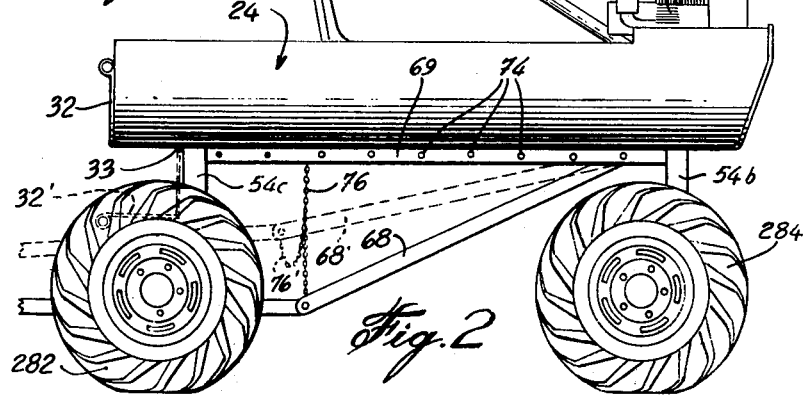
Fig. 4A
Fig. 2
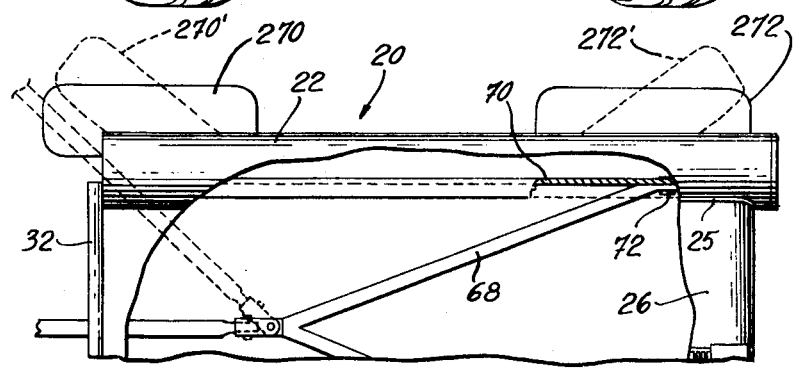
Fig. 3

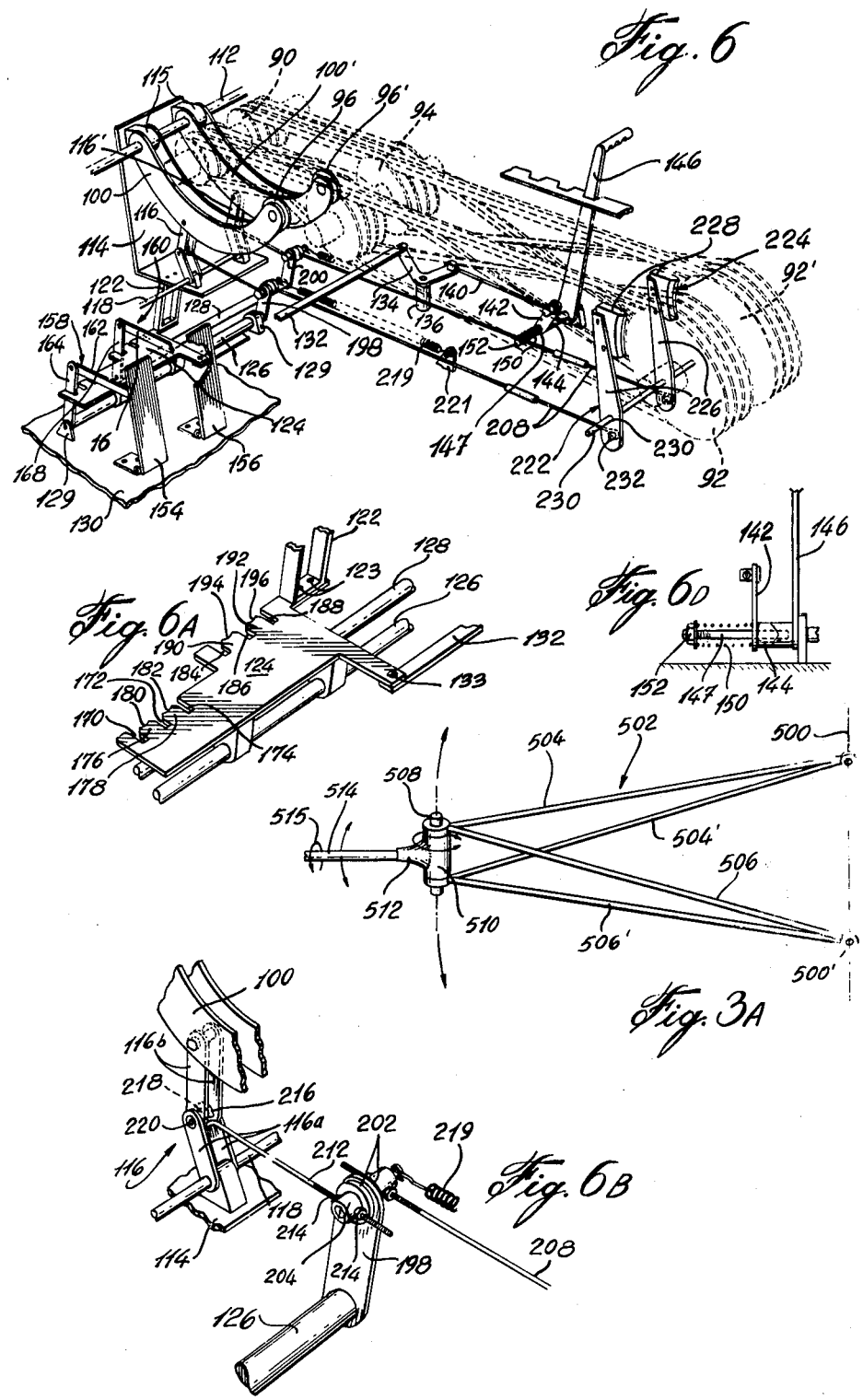

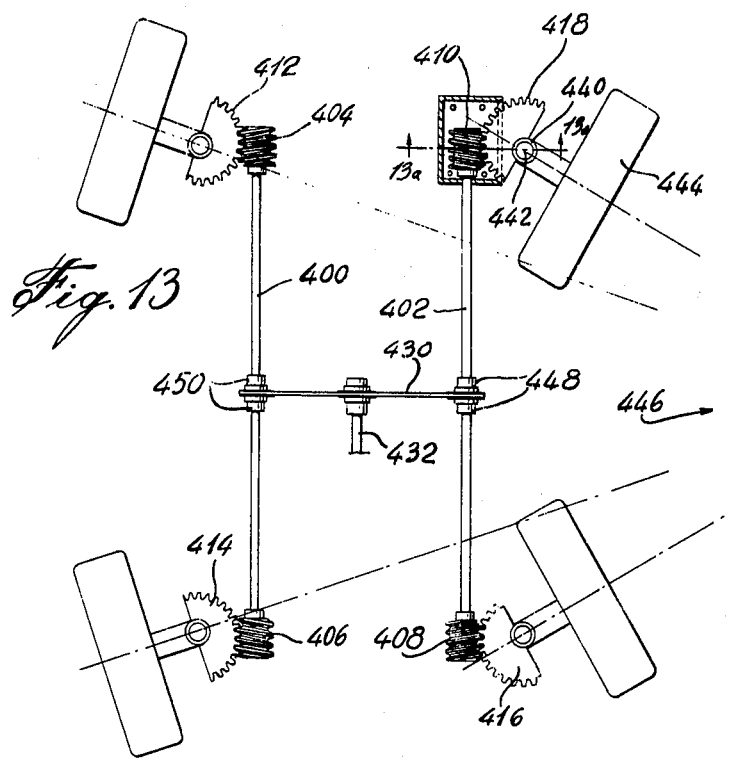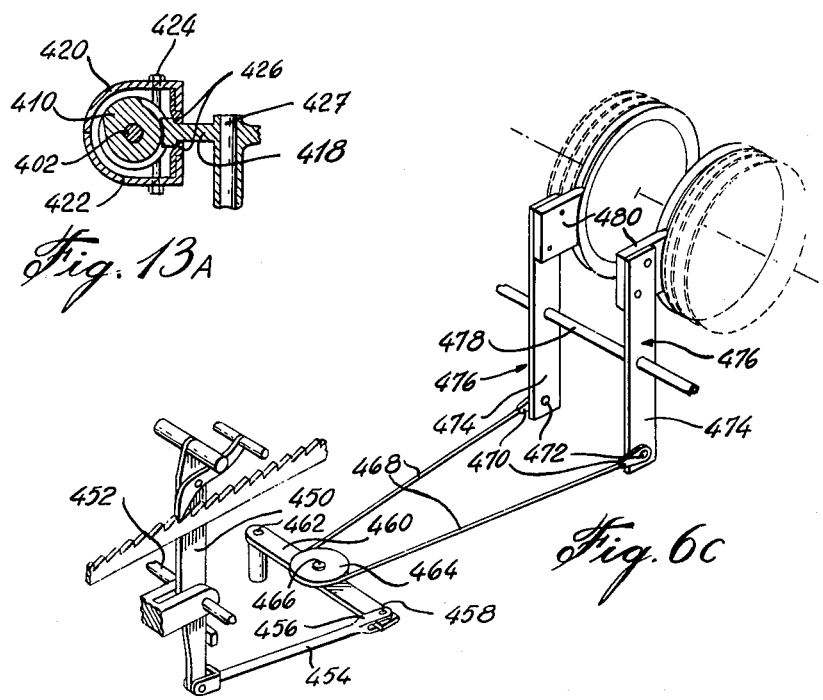

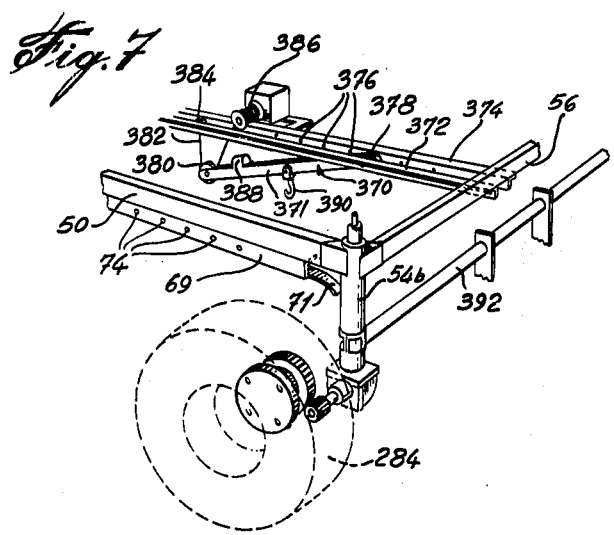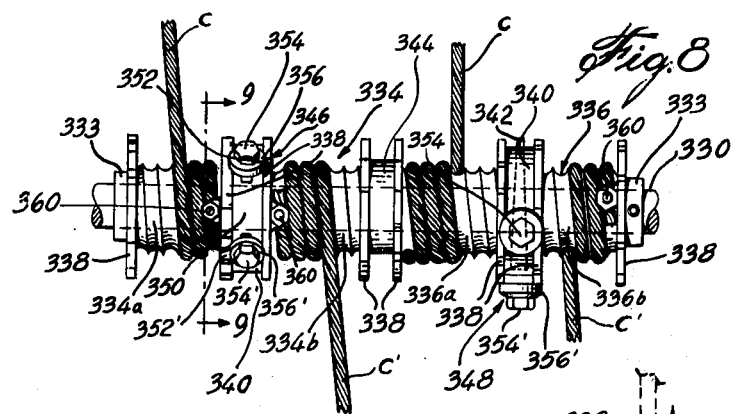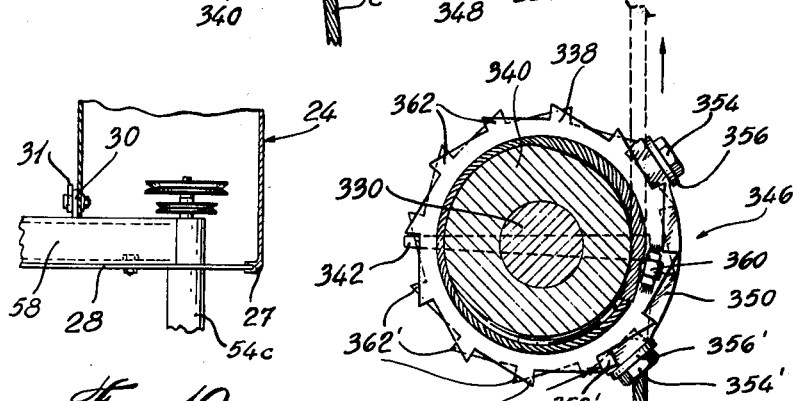

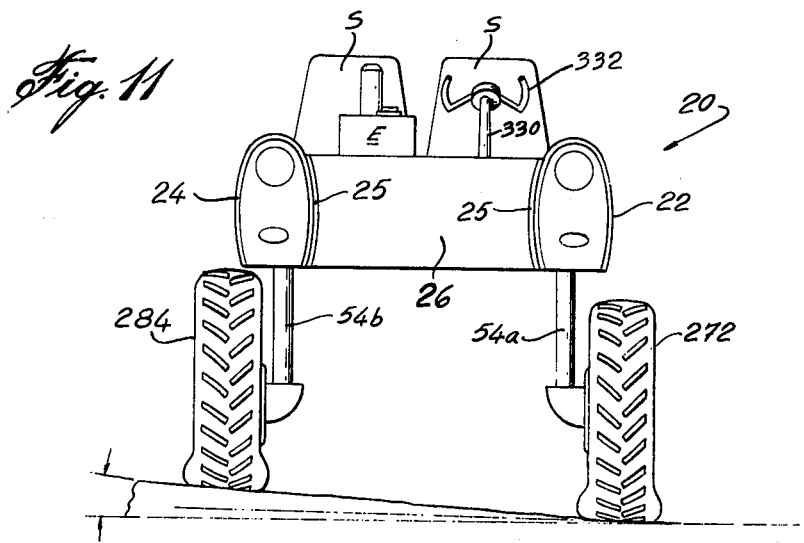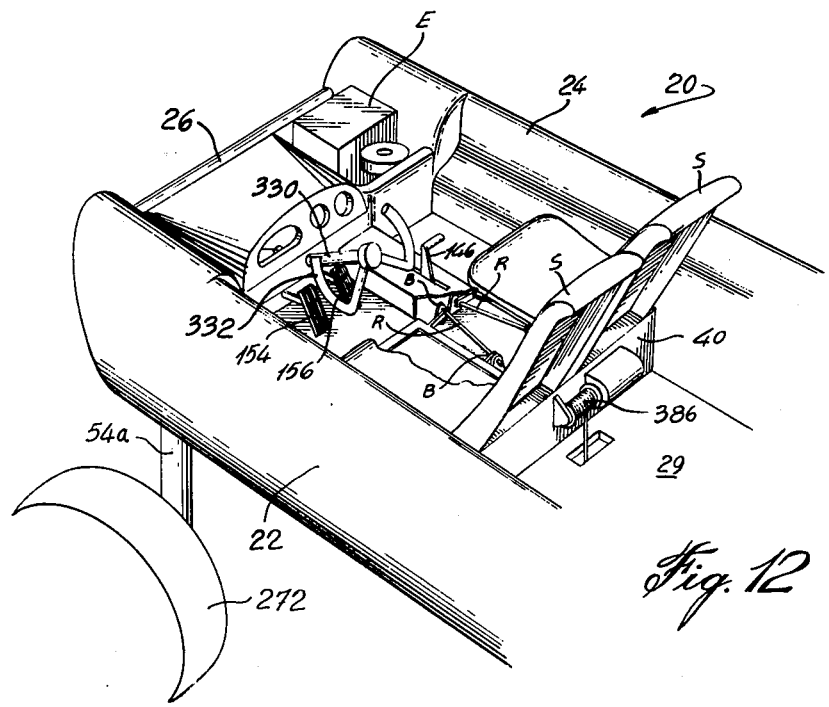

MULTI-PURPOSE VEHICLE

BACKGROUND OF THE INVENTION

1. Field of the Invention

This invention relates to a multi-purpose four-wheel drive vehicle having four-wheel steering.

2. Description of Prior Art

The broad concept of a four-wheel drive vehicle having independent gearing for each of the four wheels is known in the prior art, as is the utilization of combined four-wheel drive and four-wheel steering in a vehicle. In this regard, reference can be made to U.S. Pat. Nos. 1,461,716; 2,994,392; 2,922,482; 3,282,366; 3,596,730 and 3,666,034.

SUMMARY OF THE INVENTION

The present invention, however, is directed to a single vehicle incorporating a number of features, some of which are individually known in the prior art but which, when combined in a single vehicle, constitute a vehicle having several advantages over conventional vehicles presently employed for various uses. In particular, the multi-purpose vehicle is of light-weight construction, is relatively inexpensive to manufacture in comparison with vehicles presently employed for the same jobs as those accomplished by the vehicle according to the present invention, and has substantially less initial and operating costs.

Of the several features incorporated in the applicant's improved vehicle it is its relatively high ground clearance which is achieved by employing four vertical-axles and wheels situated at the four corners of a main frame body of the vehicle. The concept of the vertical-axle-wheel unit incorporated in the applicant's present vehicle is disclosed in applicant's U.S. Pat. Nos. 3,689,101 and 3,822,757, which are incorporated herein by reference. Each of the four vertical-axles includes an axle housing terminating in a suspension system and gear drive box, each axle housing being fully rotatable about a vertical axis. By providing a relatively high ground clearance, for example, in excess of 30 inches, the vehicle can therefore go over boulders and stumps and the wheels themselves can go over large boulders and logs. Further, as a result of the high point of impact, the improved vehicle can push down and pass over bushes and small trees without injury to either the growth or the vehicle.

A basic design of most known similar prior art vehicles, whether employing wheels or endless tracks, limits the ground clearance to less than half of the wheel or sprocket wheel diameter since straight-through horizontal axles and axially mounted driving mechanisms and housings are employed. Usually, the best of these vehicles cannot be driven safely across any surface where irregularities or obstacles exceed one foot in height. For example, small garden tractors have clearances which seldom exceed six inches.

On the other hand, while a high ground clearance is possible in the case of a conventional tractor, this is only accomplished at great expense, utilizing high cost large-diameter drive wheels and oversized transmissions to provide the required torque to drive the wheels. Further, while the feature of employing a high ground clearance in a vehicle is disclosed in U.S. Pat. No. 3,197,229 to Houlton, the basic purpose of the Houlton vehicle is to carry loads in its midriff, and is therefore not intended to tow loads, as in the case of the present invention.

The relatively high ground clearance of the applicant's vehicle gives the driver a commanding view of the work he is doing or any obstacles which he may encounter. Since the vehicle body is situated above the supporting mechanism, the vehicle has the appearance of being top-heavy, whereas the center of gravity of the vehicle is below the tops of the wheels, and most of the weight is supported by the drive and suspension mechanism, the wheel rims and the tires.

In addition to its high ground clearance, the improved vehicle according to the present invention is lighter in weight than, for example, a conventional tractor. In addition to increasing its energy consumption, the weight of the tractor limits its use to times when the soil has sufficient bearing strength to support the tractor. Further, the weight of the tractor results in compaction of the soil, thus impairing its proper function since soil is approximately 50% voids to permit air circulation for soil micro-organisms and to permit adequate circulation and drainage of water. While the mini tractor is substantially lighter in weight than the conventional tractor, it has neither the power nor is sufficiently rugged to be used as a replacement for the farm tractor. The drawbacks associated with both the conventional tractor and the mini tractor are overcome by the applicant's vehicle which is capable of doing the same work as a conventional tractor, and which, when empty, weighs approximately 500 lbs., thus minimizing the fuel consumption and decreasing the compaction of the soil. Further, the vehicle according to the present invention does not have to carry the necessary heavy weight transported by a conventional farm tractor in order to achieve the necessary traction and to do the work required.

Apart from its use as a farm vehicle, the vehicle according to the present invention may also be employed in cranberry bogs, rice paddies, and other flooded-field agricultural applications not generally mechanised at present. As well, the vehicle could be utilized in forested areas where selective logging is presently done by hand, since no mechanical device can penetrate the rows and remove trees without serious ecological damage. Further, the vehicle can be used as a means of transportation over rough territory and through marshy areas.

The improved vehicle according to the present invention utilizes a frame of U- and channel-members, the channel members or U-beams being capable of twisting so that the frame is somewhat torsionally resilient, thus eliminating the need for any kind of spring suspension assemblies or shock absorbers.

With respect to the use of U- and channel-members to form a torsionally resilient frame, U.S. Pat. No. 1,630,036 to Smith discloses an automobile frame which is specifically designed to permit a limited amount of twisting due to the configuration of the cross members which unite the channel side members. In particular, the Smith patent discloses the use of tubes with open or unwelded seams at central portions thereof, the tubes being similar to channel members. However, the frame according to the Smith patent is capable of tolerating only moderate flexing, no allowance being made for distortion of the frame members, as in the case of the present invention.

When a weight is suspended mid-point between the front and rear wheels of a vehicle, this weight may be transported by a vehicle without traction loss due to the increased load in that true traction is increased as the load increases. In non-direct loading, such as ploughing, the angle of attachment and the position of the plough may be regulated to produce greater traction forces than otherwise obtainable because the lifting force of the work angle transmits adequate traction to all four wheels more or less equally. Sufficient traction is thus obtainable by working angle alone and the vehicle weight need only be sufficient to withstand the structural forces created. Since the loads thus created are generally equal on all four wheels, the stability of the vehicle is increased while working.

The concept of supporting a tool of any kind between the front and rear wheels of a vehicle is well-known in the prior art, including U.S. Pat. Nos. 1,076,049; 1,852,537; 2,126,357; 2,413,467; 3,010,735; 2,437,581; 3,397,470; 3,690,023; and 3,858,662. Of these patents, U.S. Pat. No. 3,010,735 to Larson discloses the concept of slinging the hitch for a tow between the front and rear wheels to increase loading on the rear wheels. In particular, the Larson system utilizes the angle of pull to assist in the tractive effort. However, the teaching of the Larson patent is applicable to rear wheel drive vehicles such that the hitch point is low and the angle of draught is therefore limited. Accordingly, the Larson patent neither discloses nor suggests any means of increasing the traction of the front wheels and, indeed, no reference is even made by Larson to a four-wheel drive application.

In the case of conventional tractors, it is known to utilize a three-point hitch which prevents the upward and rearward rotation of a vehicle around the main drive wheels by means of securely attaching implements or other work loads to the rear of a tractor vehicle at three points, creating a rigid adjustable arm or boom which prevents this rotation. This hitch further increases the tractive effort of the vehicle by transmitting work loads at an angle steeper than the horizontal, thereby increasing the weight on the drive wheels.

In view of the above, the present invention is also directed to the concept of slinging a hitch below the vehicle body either between the front and rear wheels, or forward of the front wheels. By slinging the hitch between the wheels in this manner, the force applied to the rear wheels and also the front wheels to move the vehicle forward is given a component towards the ground so that the heavier the load towed and the greater traction required to pull the load, the greater will be the vertical force applied to the wheels, thereby increasing the traction between these wheels and the ground. This principle is likewise applicable to pushing loads, such as a dozer blade.

The vehicle according to the present invention also incorporates a belt drive, with one pair of belts per "gear", each belt of a pair driving two wheels situated on one side of the vehicle. One selects a given belt pair for a desired gear ratio, and the mechanism for doing so includes pedals actuating a pair of tensioning pulleys, the tensioning pulleys being urged against a selected pair of belts corresponding to the gear ratio sought.

U.S. Pat. No. 3,216,266 to Sunnen discloses a means of changing speeds by tensioning belts selectively. In the case of the Sunnen patent, however, the belts utilized must be flat, and the drag of the non-driving belt system is countered by a mechanical brake. Further, the belt transmission according to the Sunnen patent does not operate with the belts in a horizontal plane. On the other hand, the belt transmission according to the present invention can be utilized with belts having any cross-section, but is particularly suited to V-belts. As well, the construction of the applicant's belt transmission is such that brakes or similar devices need not be utilized, thus increasing the efficiency of the transmission and the vehicle. Further, unlike the Sunnen belt transmission, applicant's multiple belt transmission can be utilized for reverse motion, thus permitting the vehicle to run in reverse.

The present invention is also directed to an improved cable tensioning and actuating assembly used in association with a cable-steered vehicle. While applicant's U.S. Pat. No. 3,669,466 describes such a cable tensioning and actuating assembly, the same is relatively expensive to manufacture, particularly in view of the necessity of utilizing a pair of bevel gears. Accordingly, the applicant has provided an improved cable tensioning and actuating assembly which is less complicated in construction and therefore less expensive to manufacture and easier to adjust than applicant's previous assembly.

According to a further embodiment of the invention, there is provided an improved four-wheel steering arrangement utilizing worm gears and worms associated with each wheel assembly. While the improved steering mechanism has been described below as being used in association with the improved vehicle according to the present invention, the same could be utilized as a steering arrangement for other vehicles.

The present invention is also directed to an amphibious transporter incorporating the four-wheel drive and four-wheel steering of the vehicle referred to above. As such, the vehicle can be utilized for carrying cargo and can be employed in almost any seaport or where adequate beach facilities are available, thus converting any potential seaport to a container port. Further, the amphibious transporter can either be towed through the water or can be self-propelled.

DESCRIPTION OF THE DRAWINGS

In the drawings which illustrate embodiments of the present invention:

FIG. 1 is a perspective view of one embodiment of the frame construction for the vehicle according to the present invention, illustrating in phantom an extreme flexing of the frame members upon upward movement of one of the support tubes for a wheel assembly;

FIG. 2 is a side elevation of one embodiment of the improved vehicle according to the present invention, illustrating one of the two positions of the tow bar in phantom and the other in solid line;

FIG. 3 is a plan view of one side of the vehicle according to FIG. 2, partially broken away to illustrate the mounting of one embodiment of the tow bar to the vehicle, and illustrating in phantom positions of the wheels and tow bar while executing a turn;

FIG. 3A, which appears in the third sheet of drawings, is a perspective view of a further embodiment of the two bar according to the present invention for use in association with a four-wheel or front wheel drive vehicle;

FIG. 4A, which appears in the first sheet of drawings, is a partial vertical section of one embodiment of the outer left arm of the T-shaped subframe, the arm of the subframe being rigidly connected to the lower flange of a side rail channel member;

FIG. 6 is a perspective view illustrating one embodiment of the belt transmission and the actuating mechanisms therefor;

FIG. 6A is an enlarged perspective view of one embodiment of the knuckle linkage actuating mechanism;

FIG. 6B is an enlarged perspective view of one embodiment of the shifter plate mechanism;

FIG. 6C which appears in the sixth sheet of drawings, is a perspective view of one embodiment of the emergency braking system;

FIG. 6D is a vertical section of the shifting lever and cam lock mechanism;

FIG. 7 is a perspective view of one corner of one embodiment of the frame of the vehicle, including a wheel assembly and a timber hitch;

FIG. 8 is a plan view of one embodiment of the improved cable tensioning and actuating assembly mounted on a portion of a steering column;

FIG. 9 is a vertical section taken along the line IX—IX of FIG. 8;

FIG. 10 is an enlarged end view of one side of one embodiment of the vehicle according to FIGS. 2 to 4, broken away to illustrate the mounting of the side panels relative to the floor of the vehicle;

FIG. 11 is a front view of the improved vehicle showing banking thereof when executing a turn or operating on a sloped surface;

FIG. 12 is a top perspective view of one embodiment of the vehicle according to the present invention;

FIG. 13 is a plan view illustrating one embodiment of the steering arrangement utilizing worm gears and worms associated with each wheel assembly;

FIG. 13A is a section taken along the line XIII—XIII of FIG. 13;

DESCRIPTION OF PREFERRED EMBODIMENT

Figure 4:
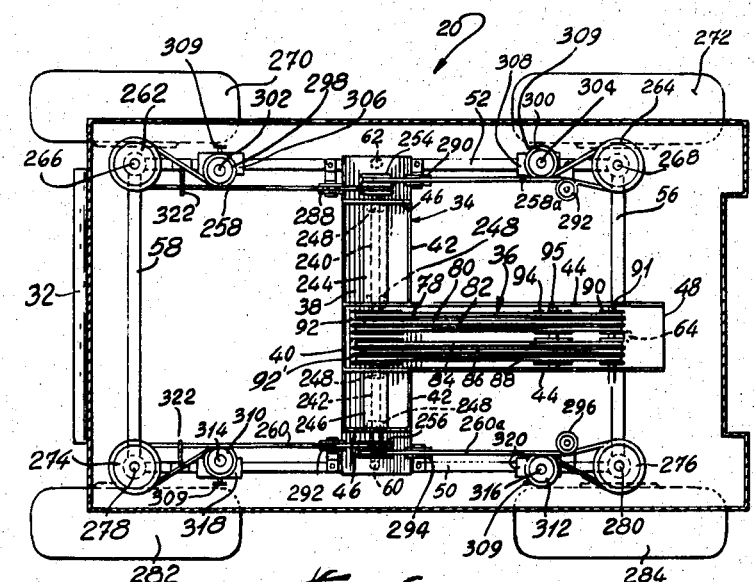
FIG. 4 is a plan view of the embodiment of the improved vehicle according to FIG. 2, broken away to illustrate the arrangement of the cable steering and belt transmission for the vehicle; but omitting details of the actuating mechanisms for the belt transmission in order to simplify the drawing.

One embodiment of the improved vehicle according to the present invention is designated generally in FIGS. 2 to 4, 11 and 12 by reference numeral 20. The vehicle has an outer body construction comprising side panels 22 and 24 which are separated from and do not, during operation of the vehicle, contact a front panel or cowl 26, there being a clearance 25 therebetween.

As best seen in FIG. 10, each of the side panels 22 and 24 have an inwardly directed U-shaped channel 27 secured to a lower outer edge thereof, the U-shaped channels extending nearly the entire length of the side panels. The U-shaped channels 27 slidably engage a floor panel 28 which is secured by bolts or similar fasteners to the frame of the vehicle, whereby the U-shaped channels are free to move longitudinally relative to the floor 28 of the vehicle. In order to limit noise due to the sliding action of the side panels relative to the floor, a plywood sheet can be utilized for the floor panel 28. Inner edges of the rear end of each side panel 22 and 24 are secured to mounting brackets 30 mounted on rear rail members of the frame, the side panels having rigid outwardly projecting members which slide through openings in the brackets 30 and are releasably engaged by releasing clips 31 which are pivotally secured to the frame for pivoting into and out of locking engagement with the portions of the projecting members extending through the openings in the brackets 30. The mounting of the side panels 22 and 24 on the frame of the vehicle by means of clips allows the body to flex with the frame without permanent distortion as the twisting action of the rail members forming the frame is readily followed by the side panels 22 and 24. The body of the vehicle also includes a tailgate 32 which is secured by means of a hinge 33 to a rear rail member of the frame, the tailgate 32 being easily lowered to a step position 32', as shown in phantom in FIG. 2, in which position the tailgate is situated against the rear frame tubes and provides easy access to the rear of the vehicle. The cowl 26 is attached forward at three points and, as in the case of the side panels, is able to flex with the frame. Further, the space between the cowl and the side panels can be seen to change with the frame flexing, ample clearance 25 being left permits this to take place. By removing the cowl 26, the motor, clutch and steering mechanisms for the vehicle are exposed. Similarly, removing the side panels, the drive mechanism of the vehicle is exposed.

As seen in FIG. 12, the vehicle also includes seats S which are pivotally hinged by means of rods R secured to the seats S, the rods R being angled forwardly and inwardly relative to the longitudinal axis of the vehicle and being pivotally mounted in brackets B secured to the floor of the vehicle. In this way, each seat can be tilted toward the centre of the vehicle so that the seat back passes immediately behind the other, thereby facilitating access to the rear of the vehicle or from the rear of the vehicle to the seats S. Since the seats S are mounted on a floor secured to a T-shaped sub-frame 34, as described below, flexing of the vehicle 20 is not transferred to the seats S.

The T-shaped sub-frame 34 comprises an openable top housing for supporting a multiple belt transmission 36, together with the belts and pulleys for transferring power from the driven pulleys of the transmission to the individual wheels of the vehicle. The T-shaped sub-frame comprises a bottom wall 38 which is substantially T-shaped in plan view, a back wall 40, outer front walls 42, inner side walls 44, outer side walls 46, and an open front end 48. Each of the walls extends at right angles to the T-shaped bottom wall 38. The inner side walls 44 are secured to the rear wall 40 and extend forwardly therefrom the length of the sub-frame 34. Further, the inner side walls 40 are parallel to the outer side walls 46 and at right angles to the rear wall 40 and outer front walls 42.

The T-shaped sub-frame 34 is connected adjacent the outer ends of the bottom wall 38 to longitudinally extending side rails 50 and 52 of the frame, at locations 60 and 62 respectively, these connections being either rigid or rotatable. The locations 60 and 62 are either at the bottom or the top of the side rail members 50 and 52. The front end of the T-frame 34 is flexibly secured to a front rail 56 of the frame at a location 64. In addition to supporting the transmission 36, the T-shaped sub-frame 34 supports the engine E which, by way of example, can comprise an eight-horsepower, four-cycle, Briggs and Stratten Engine, the engine having sufficient power to drive the vehicle up or down slopes in excess of 40°, traversing rough country, pulling half-ton logs up and down slopes and ploughing.

Referring to FIGS. 1 and 7, opposite ends of the side rails 50 and 52 are secured to post or support tubes 54a, 54b, 54c and 54d for the wheel assemblies. The frame also includes front rail 56 and a rear rail 58, opposite ends of which are likewise connected to the support tubes. The rails can be connected to the post tubes by welding or can be secured thereto by means of frame brackets mounted on the support tubes which are releasably secured to the side, front and rear rail members by means of bolts or similar fasteners. The rail members forming the frame are channel or U-members, angle members or I-beam sections, or built-up truss members, the main constraint on the configuration of the members being that they are capable of absorbing torsional forces applied thereto without permanent distortion of the frame.

The points of attachment 60, 62 and 64 of the T-shaped sub-frame 34 to the main frame are situated at or near points of miniumum flexure of the frame or rail members 50, 52, 56 and 58. However, the location of the point 64 could likewise be approximately midway along the length of the rear rail member 58 and still provide a mounting for the T-shaped sub-frame 34 which is substantially free of flexing of the rail members forming the frame. By so mounting the T-shaped sub-frame 34, flexing of the main frame does not interfere with the primary drive alignment, such that the latter may be rigidly installed.

FIG. 1 illustrates in phantom an extreme flexing of the frame members upon upward or downward movement of one of the support tubes 54 for a wheel assembly. As seen in FIG. 1, the side rails 50 and 52, and the front rail 56 assume positions 50', 52' and 56' illustrated in phantom, the front left support tube 54a assuming a raised position 54a', likewise illustrated in phantom. Upon upward movement of the support tube 54a to position 54a', the side rail 52 absorbs the stress by torquing in the direction of arrow 68, as does the side rail 50. A similar torquing action is present in the front and rear rail members 56 and 58. The angle A between the rail members and the support tubes remains constant due to the fixed attachment of the side rails to the support tubes. By utilizing a flexible frame construction such as that described, the frame is capable of absorbing upward and downward movements of the support tubes 54 of a distance approximately ¼ of the length of the shortest dimension of the frame, that is, ¼ of the length of the front and rear rail members 56 and 58. By way of example, if the front rail member were four feet in length, the frame would absorb either an upward or downward vertical movement of either of the front support tubes 54a and 54b of approximately 12 inches.

As best seen in FIGS. 2 and 3, the vehicle 20 includes a tow bar 68, the two bar being shown in phantom in FIG. 2 in its raised or full-operating position, as indicated by reference numeral 68'. The low figure position shows a tongue load supported by a chain 76 which chain becomes slack as a heavy pull is applied, transferring the tongue load forward to the connection points 72 and thus to the front wheels 272 and 284. The tow bar 68 comprises a V-shaped bar, outer free ends of which are pivotally secured to secondary rail members 69 and 70 by means of fasteners 72, whereby the tow bar 68 is free to move in a vertical plane. The secondary rail members 69 and 70 are inwardly facing channel members secured to lower surfaces of the side rail members 50 and 52 respectively, and extend almost the length of the side rail members. Opposite ends of the secondary rail members include lower lip portions 71 to assist in introducing the free ends of the V-shaped bar into engagement with the rail members 69 and 70. The ends of the V-shaped bar can be secured to the secondary rail members at various locations along the length thereof, openings 74 being provided in the secondary rail members 69 and 70 to accommodate the positioning of the tow bar at a desired location along the lengths thereof.

Flexible means such as a chain 76 attaches the V-shaped bar to the frame of the vehicle, the chain limiting the downward travel of the bar. When the tow bar is being used to pull a trailer or carts with a tongue load, the weight is taken by the chain 76, the propulsive forces being supplied by the tow bar. When obstacles or heavy ground are traversed, the tensioning of the tow bar releases the weight on the chain 76 which is, in turn, transferred at an angle to the front wheels, as well as to the rear wheels. The length of the tow bar 68 and the position of the chain 76 can be regulated for any combination of loads and positions desired. Even when the chain 76 is taut, some of the load is transferred forward. Further, attaching a work load at a proper angle adds to the effective vehicle weight and increases the traction without undue fuel consumption or ground compaction.

According to a further embodiment of the tow bar as shown in FIG. 3A, the same is constructed such that all tongue loads are transferred to the points where the tow bar is pivotally connected to the frame of the vehicle. This assures that a greater percentage of the vertical component of the load being drawn by the vehicle is transferred to the front wheels of the vehicle, more so than in the embodiment of the tow bar shown in FIGS. 2 and 3.

In this embodiment, the tow bar 502 comprises two pairs of arm members 504, 504' and 506, 506', the members 504, 504' diverging away from a point of attachment 500 of the tow bar to the vehicle frame and being rigidly connected to opposite ends of a vertical pin 508. Likewise, the members 506, 506' diverge from a point of attachment 500' of the tow bar to the vehicle frame and are likewise securely attached to opposite ends of a vertical pin 508. Pin 508 provides a bearing surface for a housing 510 which is pivotal in a horizontal plane about the pin 508 and at right angles thereto. The housing 510 has a rearwardly directed receiving portion 512 to permit the reception of a bar 514 which connects an implement or other load being towed by the vehicle to the housing 510. A connection means releasably connects the bar 514 in position in the housing 510 in such a manner that the bar is rotatable about a longitudinal axis thereof, as indicated by the double arrow 515 in the Figure.

By utilizing the arrangement described above, the tow bar is able to absorb movements in three directions of rotation, about a longitudinal axis of the bar 514, about a longitudinal axis of the pin 508, and about an axis of a line connecting the points of attachment 500, 500' of the tow bar to the frame. Thus, this arrangement permits roll, yaw and pitch actions, while transmitting all tongue loads to the points 500, 500', thus allowing for selective loading of the wheels of the vehicle as desired.

Figure 5:
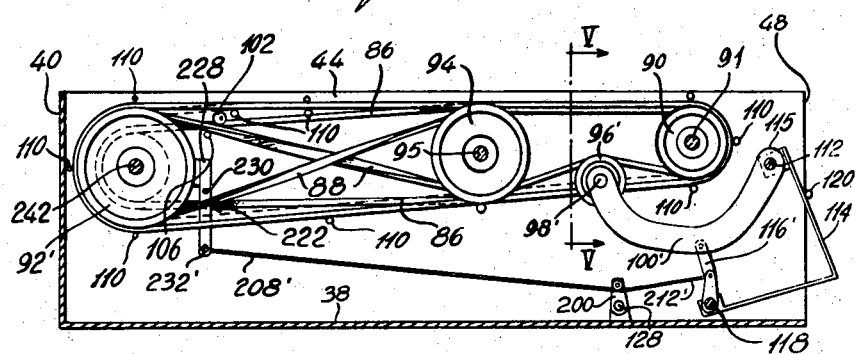
FIG. 5 is a side view of a diagrammatic of one embodiment of the improved belt transmission.
Figure 5B:
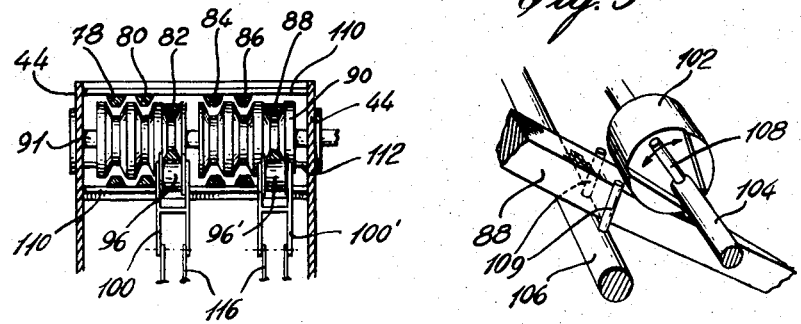
FIG. 5B is a vertical section taken along the lines V—V of FIG. 5.

As indicated previously, a multiple-belt transmission 36 is mounted in the T-shaped sub-frame 34. As best seen in FIGS. 4 to 6, the belt transmission comprises six V-belts 78, 80, 82, 84, 86 and 88, the V-belts being mounted on respective drive pulleys 90 and driven pulleys 92, 92' and being supported and held in alignment intermediate the drive pulleys and the driven pulleys by idler or guide pulleys 94. The drive pulleys 90 are mounted on an axle 91, the axle 91 being common with the crankshaft of the engine E. Alternatively, the axle 91 may be rotatably mounted at opposite ends thereof in the inner side walls 44 of the T-shaped sub-frame 34, in which case the axle 91 is indirectly connected to the crankshaft of the engine E. Likewise, the guide pulleys 94 are mounted on an axle 95, opposite ends of which are likewise rotatably mounted in the inner side walls 44 of the T-shaped sub-frame 34.

The six V-belts comprise three sets of belts: 78 84; 80,86; and 82,88. The first two sets of belts 78, 84 and 80, 86 provide two different forward speeds of the vehicle, and the third set of belts 82, 88 provide reverse movement for the vehicle. The three V-belts 78, 80 and 82 drive the wheels on the left side of the vehicle 20, as viewed in the forward operation of the vehicle, while the V-belts 84, 86 and 88 drive the wheels on the right side of the vehicle.

Selective tensioning of the different V-belts or pairs of V-belts is achieved by a pair of tensioning pulleys 96 and 96', the tensioning pulley 96 being associated and adapted to engage the V-belts 78, 80 and 82, while the tensioning pulley 96' is positioned so as to engage the V-belt 84, 86 and 88. The close proximity of the guide pulleys 94 to the drive pulleys 90 increases the amount of tensioning possible by the tensioning pulleys 96 and 96', which engage the V-belts at locations between the drive pulleys and the guide pulleys. Each of the tensioning pulleys 96 and 96' is of identical construction, comprising a pulley rotatably mounted on a respective axle 98 and 98', the axles being mounted adjacent the free ends of respective tensioning pulley arms 100 and 100'.

The V-belts 82 and 88 are crossed between the guide pulleys 94 and the driven pulleys 92 in order to permit the vehicle to operate in a reverse direction.

The V-belts 82 and 88, being crossed, are twisted and therefore do not tend to straighten out to the same extent as the remaining V-belts when not being engaged by the tensioning pulleys 96 and 96' respectively. As a result, there is a greater possibility that the crossed belts 82 and 88 will continue to rotate with the driven pulleys 92 due to frictional engagement of the twisted belts with the grooves of the respective driven pulleys. In order to restrict this continued movement of the twisted belts 82 and 88, a pair of eccentrically mounted unidirectional locking devices 102 are provided.

Figure 5A:
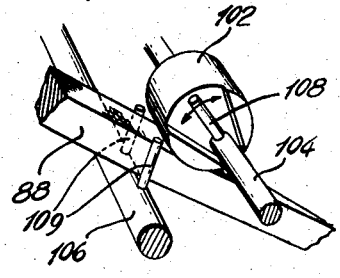
FIG. 5A is an enlarged perspective view of one embodiment of the unidirectional locking device according to the present invention, illustrating the operation thereof.

When the V-belts 82 and 88 are tensioned by tensioning pulleys 96 and 96', the belts rotate the driven pulleys 92,92' in a counterclockwise direction, as seen in FIG. 5. When the tensioning pulleys are disengaged from these belts, the tendency of the belts, if still in contact with the grooves of the driven pulleys 92, 92', is to rotate in a clockwise direction due to frictional engagement with the pulleys 92, 92'. If this occurs, the upper runs of the belts 82 and 88 actuate respective unidirectional locking devices 102, as best seen in FIG. 5A, which pivot on a rod 104 counterclockwise against the V-belts and urge the V-belts against a guide pin 106 restricting further movement of the V-belts 82 and 88. This causes the portions of the V-belts 82 and 88 adjacent the driven pulleys 92 to bow outwardly and come to rest against stops 110 placed adjacent the driven pulleys 92, whereby the V-belts 82 and 88 are clear of the driven pulleys. When the V-belts 82 and 88 are next operated in a counterclockwise direction to drive the vehicle in reverse, the undirectional locking devices 102 are pivoted away from the V-belts, a stop pin 108 or similar device limiting the pivotal movement of the devices 102 so that the devices do not rotate 360° and back into engagement with the V-belts. Spaced-apart guide pins 109 extending upwardly from rod 106 assist in belt alignment.

In FIG. 6, tensioning pulley arms 100, 100' are pivotally and slidably mounted on a rod 112, opposite ends of which are secured to the side walls of a motor-mounted extension of T-shaped sub-frame 34. The tensioning pulley arms are linked together in fixed relative positions by means of a bent plate structure 114, upper mounting support portions 115 of which engage the upper ends of the pivotally mounting tensioning pulley arms 100 and 100'. A lower end of the bent plate member 114 includes mounting supports which engage the lower ends of a pair of knuckle linkages 116 and 116', the knuckle link members having lower ends thereof pivotally and slidably mounted on a rod 118 mounted parallel to the rod 112 and likewise being secured at opposite ends thereof to the side walls of the sub-frame extension. Upper ends of the knuckle link members 116, 116' pivotally engage respective tensioning pulley arms 100 and 100' at locations partway along the length thereof, whereby actuation of the knuckle linkages 116 and 116' effects pivoting of the respective tensioning pulley arms 100 and 100' about the rod 112 and into and out of engagement with the selected V-belts.

Sliding movement of the bent plate member 114 and the tensioning pulley arms 100, 100' is effected by means of a bent bar member 122 connecting bent plate member 114 to a shifter plate 124, the bar member 122 being connected by means of bolts or similar fasteners 123 to an upper surface of the shifter plate 124, as best seen in FIG. 6A. The shifter plate 124 is slidably mounted on a pair of parallel transversely extending shafts 126 and 128 utilizing brackets mounted on the lower surface of the plate, the shafts 126 an and 128 being rotatably but non-slidably mounted in pillow blocks 129 secured to a base plate 130 which, in turn, is secured to the T-shaped sub-frame 34.

Sliding movement of the shifter plate 124 along the shafts 126 and 128 is effected by means of a bar member 132, one end of which is pintled to the shifter plate by means of bolts or similar fasteners 133 and an opposite end of which is connected to one arm of a pivotally-mounted bell-crank member 134. The bell-crank member 134 is pivotally mounted about a vertical axle 136, a lower end of which is mounted adjacent the front edge of the bottom wall 38 of the T-shaped sub-frame 34. A second arm of the bell-crank member 134 is connected by means of a rod 140 to a pivotal member 142, the pivotal member being secured to one end face of a cam lock 144, an opposite end face of the latter of which is secured to a side surface of a shifting lever 146. The shifting lever arm 146, cam lock 144 and pivotal member 142 are mounted on a shaft 147 secured to the inner side wall of the T-shaped sub-frame by means of a suitable fastener. An outer end of the shaft 147 has a threaded end which supports a coil spring 150 thereon, tension in the coil spring 150 being adjusted by means of a nut 152 mounted on the threaded end of the shaft 147, as seen in FIG. 6D.

Pivoting of the bell-crank member 134 by means of the rod 140 upon pivoting of the shifting lever 146 initiates movement of the bar member 132, thereby advancing the slider plate 124 along the shafts 126 and 128 to the position selected by the shifting lever arm, as determined by the operator.

The cam lock 144 has a pair of mating faces intermediate the ends thereof which are separated upon actuation of the shifting lever 146. Upon separation of the mating faces of the cam lock 144, the pivot member 142 is moved axially along the supporting shaft 147 away from the shifting lever 146, thereby compressing the coil spring 150. The force in the coil spring 150 forces the pivotal member 142 back toward the shifting lever, causing the cam lock to return to a position in which the mating forces are in contact while rotating the pivotal member 142 an amount corresponding to the newly-selected position of the shifting lever 146. In this way, the pivotal member 142 is pivoted on the shaft and correspondingly advances or retracts the rod 140, thereby pivoting the bell-crank member 134 about its vertical axle 136.

In order to permit sliding movement of the shifter plate 124, the operator must depress both clutch pedals 154 and 156 in the vehicle, thereby pivoting respective linkages 158 and 160 rearwardly. The linkage 158 comprises a pair of link members 162 and 164 which are pivotally secured together, the latter of which is rigidly secured to the end of the shaft 126. The linkage 160 comprises link members 166 and 168 which are pivotally secured together, the latter link member being mounted on the shaft 128. The link members 164 and 168, upon actuation of the respective clutch pedals 154 and 156, are pivoted into and out of engagement with spaced-apart slots located in adjacent edges of the shifter plate 124. Accordingly, as best seen in FIG. 6A, the link member 164 can be brought into or out of engagement with slots 170, 172 or 174. Between each of the slots 170, 172 and 174 are finger-like projections 176 and 178 having concave ends 180 and 182 respectively, the concave ends 180 and 182 corresponding to neutral positions when engaged by the pivotal link member 164. Likewise, the link member 168 can be brought into or moved out of engagement with slots 184, 186 and 188, the slots being separated by finger-like members 190 and 192 having respective concave end portions 194 and 196.

The distance between the slots in the shifter plate corresponds to the distance which the shifter plate must be advanced to permit engagment of the tensioning pulleys 96, 96' with respective pairs of V-belts. Once both of the clutch pedals 154 and 156 are depressed to the correct degree, movement of the shifter plate is effected by the rod 140 connected to the pivotal member 142 through the bell-crank member 134, and via the bar member 132 to the shifter plate 124.

Upon depressing the clutch pedals 154 and 156, rotation of the link members 164 and 168 is effected, thereby rotating the respective shafts 126 and 128. Opposite ends of the shafts 126 and 128 include members 198 and 200 which are secured respectively thereto. Since the construction of both of members 198 and 200 is identical, details thereof have only been described in respect of member 198, as seen in FIG. 6B. In particular, the member 198 has an opening therein through which is inserted a boss 202, the latter being secured in position in the opening in the member 198. The boss 202 has a cylindrical opening extending the length thereof, the cylindrical opening receiving a cylindrical pin 204 which is pivotally mounted in the cylindrical opening in the boss and extends outwardly beyond both ends of the boss. The pin 204 has a transverse opening adjacent each end thereof, one end opening receiving a threaded end of a rod 208, with adjusting nuts 210 being situated on either side of the opening in the pin 204 for adjusting the position of the rod. The opening in the other end of the pin 204 receives the threaded end of a hook member 212, the position in the opening in the pin being adjusted by means of a nut 214. An opposite end of the hook member 212 includes a loop portion 216 which slidably engages a sleeve 218, the latter being in turn slidably mounted on a pin 220 interconnecting the link members 116a and 116b forming the knuckle linkage 116. Pivotal movement of the member 198 therefore effects the straightening or collapsing of the knuckle linkage 116, thereby pivoting the tensioning pulley arm 100 into and out of contact with the respective V-belt. The hooked end 216 slidably and pivotally engages the cylindrical sleeve 218 to permit the sliding of the knuckle linkage on rod 118 relative to the hook member 212 in response to shifting of the bent plate 114 upon actuation of the shifting lever 146 by the operator. A return spring 219 connected at one end to pin 204 and at a free end to fixed point 221, returns clutch pedal 154 to its non-depressed position upon release by the operator. An identical return arrangement is provided for pedal 156.

The shifter plate 124 cannot be slid along the shafts 126 and 128 until both of the clutch pedals 154 and 156 are depressed, whereby the link members 164 and 168 are free from the slots in the shifter plate. As a result, if the shifting lever 146 is moved to a new position prior to depressing both of the clutch pedals 154 and 156, the mating faces of the cam lock 144 are separated and remain so until both of the clutch pedals are depressed. Upon depressing both of the clutch pedals, the force of the spring 150 moves the cam lock to a position in which the mating faces are in contact, thereby pivoting pivotal member 142 to a new position and advancing the shifter plate to permit engagement of the slots therein by the link members 164 and 168. Simultaneously, depressing of clutch pedals 156 and 158 pivots shafts 126 and 128 via linkages 158 and 160, whereby members 198 and 200 are rotated rearwardly so as to collapse knuckle linkages 116, 116', thereby dropping tensioning pulley arms 100, 100' and pulleys 96, 96' out of contact with the V-belts.

Once the shifter plate 124 has been advanced by the actuating mechanisms described above to a position corresponding to the desired speed and direction of the vehicle, the operator releases clutch pedals 154 and 156, permitting the link members 164 and 168 to pivot into the respective slots in the shifter plate 124. As the link members advance into the slots in the shifter plate, the respective shafts 126 and 128 are pivoted, resulting in pivotal movement of the members 198 and 200, whereby the knuckle linkages 116, 116' are straightened through the mechanism described above, pivoting the tensioning pulley arms 100 and 100' and the tensioning pulleys 96 and 96' into contact with the desired V-belts.

By moving either one or the other of the two tensioning pulleys 96, 96' into or out of the tensioning position by depressing on one clutch pedal, differential clutching and skid or directional steering of the vehicle can be accomplished, in that the wheels on only one side of vehicle are being operated in that only one of the tensioning pulleys is in engagement with a respective V-belt.

Braking of the vehicle can be accomplished by means of two brakes 222 and 224 which are pivotally secured to respective inner side walls 44 of the T-shaped subframe 34. Since the construction and operation of the brakes are identical, the details thereof have been described only in relation to brake 222. In particular, brake 222 comprises a brake arm 226 having a brake shoe 228 secured to an upper end thereof, the brake arm 226 being pivotally secured to the inner side wall by means of a pin 230. The brake arm 226 extends upwardly between the two V-belts and the brake shoe 228 can be advanced into or out of engagement with the driven pulleys 92, 92' upon actuation of the braking mechanism. The brake 222 is actuated by connecting rod 208 which is secured to the brake arm by means of a pin 232, the connecting rod being connected at the other end thereof to the pivotal member 198, as described above. Accordingly, upon depressing one or other of clutch pedals 154 and 156, connecting rods joining the pivotal members 198 and 200 mounted on the respective shafts 126 and 128, cause the brake shoes of the respective brakes 222 and 224 to be pivoted into engagement with the driven pulleys. By depressing only one of the clutch pedals, one set of wheels are locked while the other is powered, this being achieved by only two clutch pedals, thereby permitting differential braking of the vehicle. An emergency braking system can also be provided, particularly if the vehicle is to be used on public road or highways in areas where laws require such vehicles to be provided with an emergency braking system. Such an arrangement has been described below.

The diameters of the driven pulleys 92,92' can be varied depending upon the output speed of the vehicle desired. In this way, an infinite range of speeds can be achieved with the vehicle. Further, flat belts or belts having circular or other cross-sections, including hexagonal and diamond section belts, can be utilized in the transmission in place of the V-belts described above.

The driven pulleys 92 supporting the V-belts 78, 80 and 82 are mounted on an output shaft 240, while the driven pulleys 92', supporting the V-belts 84, 86 and 88 are mounted on an output shaft 242, each of the shafts 240 and 242 being separately journalled in respective tubular members 244 and 246 utilizing bearings 248 mounted in the tubular members, adjacent each end thereof. The output shafts extend outwardly through oblique openings 250 in the inner side walls 44 and openings 252 in the outer side walls 246. The outer ends of the output shafts 240 and 242 support a pair of adjacent pulleys 254 and 256, the pulleys 254 driving belts 258 and 258a while the pulleys 256 drive belts 260 and 260a. The belts 258 and 258a drive the wheels on the left side of the vehicle, while belts 260 and 260a drive the wheels on the right side of the vehicle.

The belts 258 and 258a drive spaced-apart pulleys 262 and 264, the pulleys 262 and 264 being mounted adjacent the upper ends of vertical shafts 266 and 268 respectively. Vertical shafts 266 and 268 drive respective wheels 270 and 272 by means of individual vehicle wheel drive and suspension assemblies, such as those described in applicant's U.S. Pat. Nos. 3,689,101 and 3,822,757, which are incorporated herein by reference. Likewise, the belts 260 and 260a drive pulleys 274 and 276 mounted on respective vertical shafts 278 and 280, the shafts 278 and 280 driving respective wheels 282 and 284, utilizing wheel drive and suspension assembled as per applicant's above noted U.S. patent, and as represented diagrammatically in FIG. 7.

Belt 258 is held in alignment by guide pulley 288, guide pulley 288 being rotatably mounted on a horizontal axle supported by spaced-apart upward extending arms. Likewise guide pulleys 290 and 292 maintain alignment of belt 258a. The arms supporting the guide pulleys 288 and 290 extend upwardly beyond the respective guide pulleys so as to further maintain alignment of the belts 258 and 258a. As well, guide pulleys 292, 294 and 296 are mounted in support arms secured to side rail member 50 for guiding the belts 260 and 260a in paths of travel. Further, the arms of any or all of the guide pulleys may be spring-loaded in order to increase the tension in the belts. Guide pulleys 292 and 296 may be replaced by Y-shaped forks as at 322 to conserve space without adversely affecting the operation of the mechanism.

The belts 258 and 258a are also provided with a pair of spaced-apart tensioning idlers 298 and 300 which are rotatably mounted on vertical stub axles 302 and 304 respectively. The lower ends of the stub axles are mounted on sliding clamp blocks 306 and 308, respectively, the sliding clamp blocks releasably engaging the side rail member 52 of the frame and being locked in position by set screws or similar releasable fastener means 309. Likewise, the belts 260 and 260a are provided with tensioning idlers 310 and 312 mounted on respective vertical stub axles 314 and 316, lower ends of the stub axles being rotatably mounted in sliding clamp blocks 318 and 320. The sliding clamp blocks are releasably secured to the side rail member 50 at desired locations by means of set screws or similar releasable fastener means 309.

Each belt system 258, 258a and 260, 260a are provided with a pair of Y-shaped forks or guides 322, as seen in FIG. 4A, situated adjacent the driven pulleys to prevent the continuous belts from vibrating out of the pulley grooves. As a result, belts can be readily changed and can be of commercial grade as to length, as ample adjustment is present.

Use of the swivelling wheel suspension as described in Applicant's previous patents referred to above, when coupled with a separate transmission to the wheels on each side of the vehicle, produce a stable vehicle as follows. When the vehicle is making a turn and power is applied to the outer pair of wheels, rising suspension on that side causes the vehicle to bank into the turn. On the other hand, the lack of or lessening of power applied to the inner wheels of the vehicle in the turn lowers the side of the vehicle to the inside of the turn, countering the centifugal force of the turn by banking. This also reduces or removes the pressure needed to steer the vehicle by applying power to the outside wheels. This is exemplified in FIG. 11 of the drawings in which it is seen that the right side of the vehicle, as seen in FIG. 11, is at an elevated level relative to the left-hand side of the vehicle. Further, with the suspension arrangement employed by the applicant, there is zero suspension in reverse, and none when the vehicle is coasting or stationary. Rather, suspension is achieved only when the vehicle is moving in a forward direction under power.

Steering of the vehicle is accomplished either by means of cables utilizing an arrangement described in applicant's U.S. Pat. No. 3,669,466, which is incorporated herein by reference, or by means of worm and worm gear arrangements associated with each wheel assembly, such as described below in association with FIGS. 13 and 13A.

Tensioning and actuating of the cables associated with the cable steering arrangement can be achieved utilizing the tensioning and actuating device described in the U.S. Patent, as well as by means of the tensioning and actuating device shown in FIGS. 8 and 9. In particular, a steering axle 330 has a steering wheel 332 mounted at the upper end thereof, the steering axle being rotatably mounted about its longitudinal axis in any well-known manner, relative to the body of the vehicle.

Two pairs of spirally grooved drums are mounted adjacent a lower end of the steering axle 330, the drums being held in position on the axle 330 by means of two locking collars 333 secured to the axle 330 adjacent opposite ends of the two pairs of drums. The two pairs of drums comprise a first pair of spirally grooved drums 334 and a second pair of spirally grooved drums 336, each of the grooved drums having a cable adjusting ratchet 338 secured to each end thereof, there being eight such adjusting ratchets 338 altogether. A cable adjusting ratchet collar 340 is mounted on the axle 330 between the drums of each pair of grooved drums 334 and 336, the ratchet collars 340 being non-rotatably secured in position on the axle 330 by means of a taper pin 342 extending through aligned openings in the axle and collar. A third collar 344 separates the pairs of drums 334 and 336.

The grooved drums of each pair of drums 334 and 336 are releasably secured in fixed angular positions with respect to each other by means of respective clamping means 346 and 348. Each clamping means comprises a cable adjusting pawl 350, opposite ends of which have laterally outwardly directed lug portions 352 and 352'. Each end of the cable adjusting pawl 350 is secured in position to the respective adjusting ratchet collar 340 by means of adjusting pawl screws 354 and 354' which are inserted in openings adjacent opposite ends of the adjusting pawl 350 and engage aligned threaded openings in the collar 340. Each screw has a respective adjusting pawl washer 356 and 356' situated thereon.

Each of the drums of each pair of drums supports one end of a cable for steering the wheel assemblies on one or other sides of the vehicle. For example, portions of cable C which steer the two wheel assemblies on one side of the vehicle are wound around drums 334a and 336a, the ends of the cable C being secured to the respective grooved drums by means of respective adjusting screws 360. Likewise, portions of cable C' are wound around grooved drums 334b and 336b, with ends of the cable being secured to the respective drums by adjusting screws 360. The adjusting ratchets 338 secured to adjacent drums of each pair of drums include teeth portions 362 and 362', the teeth portions on one adjusting ratchet being inclined in a rotational direction and the teeth portions 362' on the adjacent ratchet being inclined in the opposite rotational direction, as best seen in FIG. 9. The teeth portions of the ratchets are engaged by the outwardly extending lugs 352 and 352' of the pawl 350. In order to increase or decrease tension in the cable C adjusting pawl screw 354' is first loosened somewhat and adjusting pawl screw 354 is loosened to an even greater extent so as to permit the teeth portions of the adjusting ratchet 338 to pass thereunder, whereby grooved drum 334a can be rotated relative to spirally grooved drum 334b. Loosening screw 354' to a greater extent than screw 354 permits drum 336b to be rotated relative to drum 336a. Likewise, tension in the cables wound around drums 336a and 336b can be increased or decreased. Once the desired loosening or tensioning of the cables has been achieved, the adjusting pawl screws are again tightened in position to the ratchet collar. By loosening the pawl, the ratchet teeth pass beneath the lug as the drum is rotated.

Since the operation and arrangement of the cables has been described in applicant's prior U.S. Pat. No. 3,669,466, the same is incorporated herein by reference. Further, by avoiding the use of machined bevel gears as in the case of the tensioning and actuating mechanism of applicant's prior patent, the present acutating and tensioning mechanism is less expensive to manufacture and easier to adjust. Further, the present tensioning and adjusting mechanism is not limited in application to the vehicle according to the present invention, and could likewise be used in association with any four-wheel drive vehicle or with a boat or most any other means of transportation employing cable steering drums.

In addition to the tow bar constructions shown in FIGS. 2, 3 and 3A of the drawings, various other attachments can be employed with the applicant's improved vehicle, including: a basic power pack to provide power to activate standard tractor attachments; an estate rotary mower; an electric winch and lights; a plough; a scraper, rake and brush; a snow thrower; a pumping unit; an auxiliary power unit; and a harrow, potato-digger and row cultivator; a seed drill, etc.

Additionally, the improved vehicle can be supplied with a logging attachment in the form of a timber hitch 370, as best seen in FIG. 7. Timber hitch 370 includes a timber hitch member 371 pivotally mounted between a pair of spaced-apart angle members 372 and 374 secured at opposite ends thereof to the front and rear rail members 56 and 58 respectively, and may be affixed to T-shaped subframe 34 as well. The angle members 372 and 374 have aligned openings 376 in the vertical portions thereof, the openings 376 being spaced-apart along the length of the members 372 and 374 to permit insertion of a hinge pin 378 for pivotally securing one end of the timber hitch member 371.

Adjacent a free end of the timber hitch member 371 is a rotatably mounted pulley 380 for receiving a cable 382. One end of the cable is secured to the angle members 372 and 374 at a location 384, the cable extending around the pulley 380 and upwardly on the other side thereof. The free end of the cable can be attached to a low energy winch 386 for raising and lowering the free end of the timber hitch member 371, the winch 386 being, in practice, mounted on the outer surface of rear wall 40 of the T-shaped subframe 34, as seen in FIG. 12. The timber hitch member 371 is provided with a locking device or key 388 part way along an upper surface thereof, the locking device or key 388 adapted to enter the space between the angle members when the arm is raised to its uppermost position. In this position, the timber hitch absorbs all of the lateral and longitudinal forces, leaving only the vertical moments to be absorbed by the winch cable 386. Further, the timber hitch member 371 is provided with a pivotally mounted hook 390 at a desired location along the length thereof, depending upon the degree of mechanical advantage desired.

An implement support bar 392 is shown as being clamped at opposite ends thereof to support tubes 54a and 54b, or likewise can be connected to tubes 54c and 54d, the bar 392 being used to support implements such as a snow scraper attachment which is mounted on the front end of the vehicle, or other attachments such as a roto-tiller mounted aft on the vehicle.

The following is a table setting out specifications of one embodiment of the vehicle according to the present invention when utilized as a replacement for a conventional tractor.

| | |
|---|---|
| Length | 92" |
| Width | 50" |
| Height (at back of seat) | 58" |
| Empty Weight | 500 lbs. |
| Gross Weight | 1200 lbs. |
| Wheel Base | 62" |
| Tread (at outside of tires) | 62" |
| Horsepower | 8 |
| Engine | 4 cycle Briggs & Stratton |
| Fuel | Gasoline (no oil mixture required) |
| Steering Radius | 0° |
| Draw Bar Pull | 800 lbs. at 900 lbs. Gross Weight |
| Tires | 27" × 8.50 × 15" Terra Trac |
| Tire Pressure | 3 P.S.I. |
| Gear Reduction | 72 to 1 (std. low range) |
| Ground clearance | 31" |
| Number of Wheels | 4 |

As an alternative to employing cable steering of the vehicle, the following steering mechanism can be employed.

As seen in FIG. 13, the further embodiment of the steering mechanism comprises two longitudinally extending parallel shafts 400 and 402, each shaft having a worm mounted on the end thereof, the worms being designated respectively by reference numerals 404, 406, 408 and 410. Each of the worms engages a respective worm gear designated by reference numerals 412, 414, 416, and 418. Since each of the worm gear and worm assemblies is of identical construction, the details of the construction of the worm and worm gear and the manner of securing the two together have been described in detail in respect of worm 410 and associated worm gear 418, taken in conjunction with FIG. 13A.

As seen in FIG. 13A, a pair of housings 420 and 422 hold the worm and worm gear in contact, the housings being of identical construction and being secured together by means of bolts or similar fasteners 424. The housings 420 and 422 have inner tapered faces 426 which engage cooperating tapered faces on the worm gear 418 and which, under the action of the bolts 424, allow for adjustment of the worm relative to the worm gear. Further, the housings 420 and 422 may be fitted with suitable bearings for supporting the end of the longitudinal shaft 402.

The longitudinal shafts 400 and 402 are driven by a chain 430 which engages sprockets mounted on the longitudinal shafts, the chain 430 being driven by a driving sprocket mounted on steering column 432. By utilizing worms and worm gears with each of the wheel assemblies, four-wheel steering can be effected. In such a case, the worm and worm gears are so situated that the two front wheels move in the same direction of rotation upon rotation of the steering column 432 and the two rear wheels likewise rotate in the same direction, as shown in FIG. 13. Further, the worm gear and gear assemblies at one end of the longitudinal shafts 400 and 402 are in an opposite direction to the worm and gear assemblies at the other ends so as to produce the required steering direction.

Each of the worm gears comprises a segment of a gear which is mounted on a respective tubular pivot member associated with each of the wheel assemblies, the tubular pivot member being rotatably mounted about its longitudinal axis in a respective tubular post of the wheel assembly. By way of example, the worm gear 418 is mounted on the tubular pivot member 440, the worm gear being secured to the tubular pivot member at a location offset from the center of curvature of the worm gear. As a result, the pivotal point 442 of the worm gear 418 is so positioned as to produce accelerating movement of the wheel 444 when the wheel is turned to the right, and a decelerating movement when the wheel 444 is turned to the left. In other words, as the longitudinal shaft 402 rotates the worm 410 so as to produce a clockwise rotation of the worm gear 418, the angular speed of the worm gear increases as the worm gear rotates in a clockwise direction in plan view. On the other hand, the angular speed of the worm gear 418 decreases as the worm gear continues to move in a counterclockwise direction in plan view. This increase or decrease in angular speeds of the worm gear is due to the fact that the distance between the pivotal point 442 and the worm 410 increases or decreases as the worm gear 418 moves in a clockwise or counterclockwise direction. Further, since the tubular pivotal member is mounted in the tubular post secured to the frame of a vehicle, as the distance between the pivotal point 442 and the worm 410 increases, the worm 410 and its longitudinal shaft 402 are urged inwardly a distance corresponding to an increase in distance between the pivotal point 442 and the worm gear. However, the worm and worm gear are held in contact by the housings 420 and 422.

The degree of offset of the worm gear 418 mounted on the tubular pivotal member 440 varies according to the wheel base of the vehicle and the tread of the vehicle so as to produce a steering movement with a generally common point 446 for all steered vehicles in and beyond the normal steering range of vehicles. Further, suitable thrust bearings 448 and 450 support the respective longitudinal shafts 400 and 402 so as to accommodate the inward deflection of the ends of the longitudinal shafts 400 and 402 as the distance between the pivotal point and the worm gear increases.

The steering axle 432 controls the steering and may be separately and alternately linked to either the front or rear sections of a vehicle. In such a case, the shafts 400 and 402 would be separated between the thrust bearings 448 and 450 and the chain drive 430 would be duplicated for each of the front wheels and the rear wheels of the vehicle. In this way, it would be possible to steer either end of the vehicle in either direction separately or in combination with the remaining wheels of the vehicle.

As noted above, the vehicle according to the present invention can be equipped with an emergency braking system, particularly if the vehicle is to be employed on public roads or highways in areas where laws require such systems to be provided in vehicles operated on public roads or highways.

As best seen in FIG. 6C, the emergency braking system includes an actuating lever 450 which is pivotally mounted in a rod 452 extending between the inner side walls 44 of the T-shaped sub-frame 34. The upper end of the actuating lever 450 is situated within reach of the operator of the vehicle, while a lower end of the actuating lever 450 has one end of a connecting rod 454 coupled thereto, an opposite end of the connecting rod 454 being pivotally connected via a clevis arrangement 456 and a pin 458 to the pivotally mounted bar 460. The bar 460 is pivoted at its inner end about vertically extending pin 462, the lower end of the pin being secured to the bottom wall 38 of the T-shaped subframe 34.

A pulley 464 is rotatably mounted in a horizontal plane about a pin 466, a lower end of the pin 466 being mounted in the bar 460 at a location between the mounting pin 462 and the connection of the clevis 456 to the end of the bar. A cable 468 extends around the pulley 464, opposite ends of the cable being pivotally connected by means of connectors 470 and pins 472 to the lower ends of brake arms 474 of a pair of pivotally mounted brakes 476. Both brake arms 474 are pivotally mounted on a laterally extending rod 478 mounted at opposite ends thereof in the inner side walls of the T-shaped subframe. Upper ends of the brake arms 474 support brake shoes 480 which can be pivoted into and out of contact with respective driven pulleys. The brake arms 474 extend upwardly between lower runs of adjacent V-belts such that the brake shoes engage the driven pulleys at locations between upper and lower runs of the V-belts.

Actuation of the emergency braking system is by means of the actuating lever 450 which, when pulled rearwardly by the operator, pivots the actuating lever about the rod 452, thereby advancing rod 454 in a forward direction so as to pivot the bar 460 about the pin 462, thereby drawing cables 468 forward and pivoting the brake shoes into contact with the driven pulleys.

Figure 14:
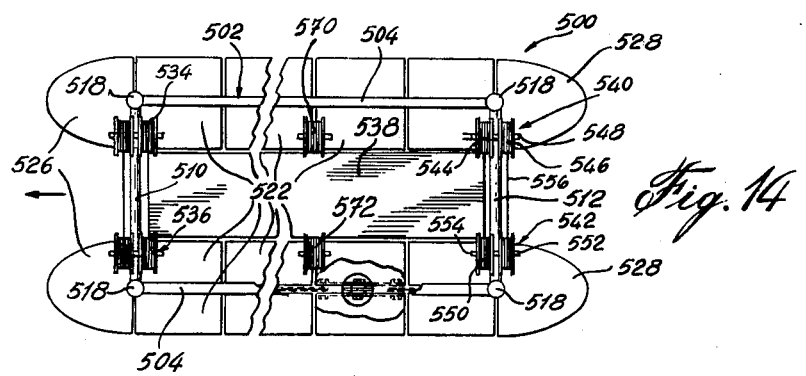
FIG. 14 is a plan view of one embodiment of the improved vehicle according to the present invention for use as an amphibious transporter.
Figure 15:
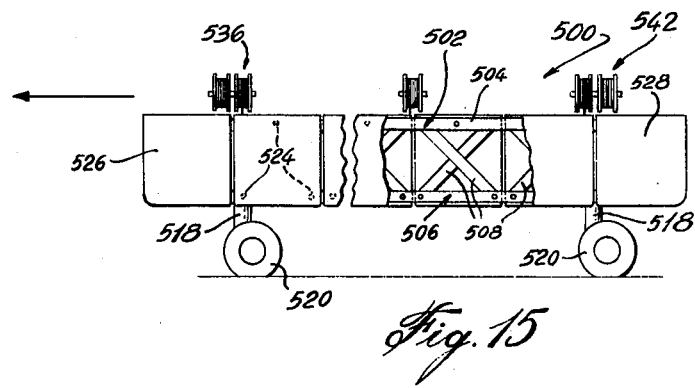
FIG. 15 is a side view of the embodiment of the transporter according to FIG. 14, partly broken away to illustrate the interior construction of the transporter.
Figure 16:
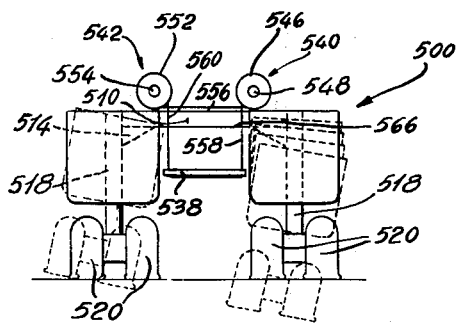
FIG. 16 is a rear view of the vehicle of FIG. 14.

The vehicle according to the present invention can also be utilized as an amphibious transporter or container lighter as shown in FIGS. 14 to 16. As is in the case of the embodiment according to FIGS. 1 to 13, the container lighter or amphibious transporter 500 employs a flexible frame 502 including a pair of upper longitudinal frame members 504 and a pair of lower longitudinal frame members 506, the upper and lower longitudinal frame members being interconnected by cross-brace members 508. Ends of the upper and lower longitudinal frame members 504 and 506 are connected at corners of the frame to post members 518 which support the drive and suspension assemblies for the wheels 520 of the amphibious transporter 500. The ends of the longitudinal frame members are interconnected by an upper front rail member 510 and an upper rear rail member 512 which are connected to the post members 581.

Lower front and rear rail members are not utilized since a high ground clearance is desired at preferably both the front and rear of the transporter 500, as best seen in FIG. 16. The high ground clearance is provided in order to admit trucks and containers beneath the front and rear rail members 510 and 512. Gusset plates 514 are provided between the front and rear rail members and the post members, the gusset plates being situated between adjacent flotation cells.

A plurality of flotation cells 522 are secured in pairs to the side rail members 504 and 506, one flotation cell being situated on each side of the side rail member, as seen in FIG. 14. Each flotation cell 522 has three points of attachment 524 to the upper and lower frame sections, the points of attachment being spaced apart in a triangular manner in side view, as seen in FIG. 15. By attaching the flotation cell 522 in this manner, flexing of the frame 502 can occur without distortion of the flotation cells, the degree of flexing along the length of the transporter being indicated in phantom in FIG. 16. A pair of front flotation cells 526 extend forwardly of and are secured to the front rail member 510 and front post members 518; and a pair of rear flotation cells 528 extend rearwardly from and are secured to the rear rail member 512 and the rear post members 518.

Figure 14A:
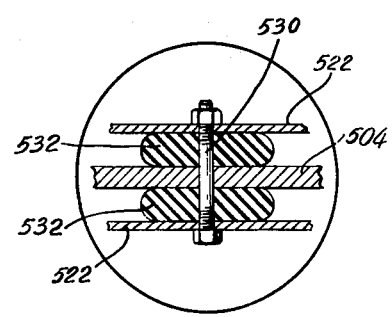
FIG. 14A is an enlarged plan view of one embodiment of the arrangement of securing the floatation cells to the frame of the transporter.

The flotation cells 522 are secured to the transporter frame 502 by utilizing bolts or similar fasteners 530 extending through adjacent vertical walls of each pair of flotation cells and through the upper and lower longitudinal frame members situated therebetween. As best seen in FIG. 14A, rubber or elastic pads 532 are situated between the outer surfaces of the adjacent walls of the flotation cells and the frame member situated therebetween, the rubber or elastic pads 532 allowing for distortion of the frame relative to the flotation cells, as well as providing a sealed joint for the flotation cells.

A pair of winding drums or hoists 534 and 536 situated on either side of the amphibious transporter 500 adjacent the front end thereof effect raising of a front end of a platform or other load 538 situated within the space intermediate the flotation cells and the front and rear rail members 510 and 512. A pair of drum complexes 540 and 542 are situated on either side near the rear end of the amphibious transporter 500 in order to lift the rear end of the platform or load 538. The drum complex 540 comprises a pair of spaced-apart aligned drums 544 and 546 which, when the load 538 is in position, are locked together by means of a common shaft 548. Likewise, the drum complex 542 comprises spaced-apart aligned drums 550 and 552, which, when the load is in position, are locked by a second common shaft 554.

A cable 556, which has been wound around the drums 552 and 546 several times and is locked thereto, comes to rest taut under the drums. Hoisting cables 558 and 560, when positioned, are wound so as to pass over drums 544 and 550 respectively. When the shafts 548 and 554 are locked to their respective drums, the system is allowed to float. As a result, flexing of the transporter 500 will cause more strain to be placed alternately either on cable 558 or 560, the strain being transmitted through cable 556 by torque through the load or platform 538. If cable 560 receives the greater strain, cable 560 will be pulled downward, unwinding a portion of the cable 560 from drum 550 and thereby causing rotation of drum 550. Rotation of drum 550 torques shaft 554, causing shaft 554 and drum 552 to rotate. Rotation of drum 552 causes a portion of cable 556 to be wound therearound, simultaneously causing a corresponding amount of cable 556 to be unwound from drum 546, thereby rotating shaft 548 and drum 544 so as to wind a portion of cable 558 around drum 544. This brings the drum system to rest by equalizing the torquing action through platform or container 538. This has the same effect as if the forward end of the load were suspended midway between pairs of drums 540 and 542. In this manner, heavier loads may be carried with greater stability, and by the corners where the platform or cargo boxes are stressed to receive the loads.

By employing the above four drum systems at both ends of the transporter 500 and positioning locking winding drums 510 and 512 at the center of the vehicle, the longitudinal or swaying motion of the load will be generally one-half the movement of the vehicle at one end, and more than one container may be carried.

The solid line 566 illustrates the high ground clearance of the transporter 500. With this arrangement, and as noted above, the transporter can be loaded or unloaded by passing over the object to be carried, even if it is upon a platform or truck. Likewise, since the center is clear between the frame and the flotation cells, loads may be hoisted in or out of the vehicle whether it is upon land or in the water. Further, recess openings such as manholes are provided in the flotation cells 522 to facilitate entry to the cells and thereby permit the securing thereof to the rail members of the frame. As well, spaces are left between longitudinally adjacent flotation cells to permit flexing of the frame and cells without damage thereto.

As an alternative embodiment of the worm and worm gear steering arrangement, it is possible to replace the offset mounting of the worm gears by worm gears, each having an irregular shape such as a segment of a heart shaped cam with teeth which will result in equal turning of the wheels on both sides of the vehicle as 90° rotation of the wheels is reached.

I claim:

1. In a multi-purpose vehicle comprising a generally rectangular frame supported by a pair of front wheels and a pair of rear wheels each of said wheels adapted to be driven and steered, said frame having a pair of longitudinally extending frame members and a pair of members transverse to said longitudinally extending frame members comprising a front and a rear frame member, the improvement comprising spaced-apart connecting means formed in each of said longitudinally extending frame members along the length thereof, a tow bar having at least one pair of arms joined at one end of each arm, each of the free ends of said arms being freely pivotally secured respectively in a selected one of said connecting means in each of said longitudinally extending frame members, and flexible means proximate the juncture of said pair of arms and intermediate said free ends of said pair of arms and said pair of rear wheels for selectively varying the division of the vertical force at said juncture of said pair of arms of said tow bar as between said pair of rear wheels and said pair of front wheels.

2. A vehicle as set forth in claim 1 wherein said means for selectively varying the division of the vertical force at said juncture of said pair of arms of said tow bar as between said pair of rear wheels and said pair of front wheels comprises a chain connected between said tow bar proximate said juncture and said frame whereby when said tow bar pulls an object thereby creating a tongue load having a vertical component of force, at least a portion of said vertical component of force is carried by said chain and transferred to said pairs of front and rear wheels and when obstacles are traversed by said vehicle whereby said tow bar is tensioned to release at least a portion of said vertical component of force on said chain said portion of said vertical component of force is transferred through the said free ends of said arms whereby the vertical component of force on said pair of front wheels is increased.

3. In a multi-purpose vehicle comprising a generally rectangular frame supported by a pair of front wheels and a pair of rear wheels each of said wheels adapted to be driven and steered, said frame having a pair of longitudinally extending frame members and a pair of members transverse to said longitudinally extending frame members comprising a front and a rear frame member, the improvement comprising spaced-apart connecting means formed in each of said longitudinally extending frame members along the length thereof, a tow bar comprising two pairs of arms joined at one end of each pair of arms, each of the free ends of said two pairs of arms being freely pivotally secured respectively in a selected one of said connecting means in each said longitudinally extending frame member, each of the pairs of arms at the junctures thereof being connected to opposite end portions of a vertically extending bearing means, coupling means rotatably mounted on said vertically extending bearing means intermediate said connections of said pairs of arms to said bearing means, said coupling means having receiving means adapted to receive for releasable securement an end of an implement attachment, and flexible means proximate the juncture of one of said pairs of arms and intermediate said free ends of said one of said pairs of arms and said pair of rear wheels for selectively varying the division of the vertical force at said juncture of said pairs of arms of said tow bar as between said pair of rear wheels and said pair of front wheels.

4. A vehicle as set forth in claim 3 wherein the free ends of each pair of arms are joined together for pivotal attachment to one of said pair of said longitudinally extending frame members.

5. A vehicle as set forth in claim 3 wherein said bearing means comprises a vertically extending pin and the coupling means comprises a housing mounted on said pin for rotation about the axis of said pin.

6. In a multi-purpose vehicle comprising a generally rectangular frame supported by a pair of front wheels and a pair of rear wheels each of said wheels adapted to be driven and steered, said frame having a pair of longitudinally extending frame members and a pair of members transverse to said longitudinally extending frame members comprising a front and a rear frame member, the improvement comprising a pair of tow bar supporting members secured to said frame, each of said tow bar supporting members having spaced-apart connecting means formed along the length thereof, a tow bar having at least one pair of arms joined at one end of each arm, each of the free ends of said arms being freely pivotally secured respectively in a selected one of said connecting means in each of said tow bar supporting members, and flexible means proximate the juncture of said pair of arms and intermediate said free ends of said pair of arms and said pair of rear wheels for selectively varying the division of the vertical force at said juncture of said pair of arms of said tow bar as between said pair of rear wheels and said pair of front wheels.

7. A vehicle as set forth in claim 6, wherein said means for selectively varying the division of the vertical force at said juncture of said pair of arms of said tow bar as between said pair of rear wheels and said pair of front wheels comprises a chain connected between said tow bar proximate said juncture and said frame whereby when said tow bar pulls an object thereby creating a tongue load having a vertical component of force, at least a portion of said vertical component of force is carried by said chain and transferred to said pairs of front and rear wheels and when obstacles are traversed by said vehicle whereby said tow bar is tensioned to release at least a portion of said vertical component of force on said chain said portion of said vertical component of force is tranferred through the said free ends of said arms whereby the vertical component of force on said pair of front wheels is increased.

8. In a multi-purpose vehicle comprising a generally rectangular frame supported by a pair of front wheels and a pair of rear wheels each of said wheels adapted to be driven and steered, said frame having a pair of longitudinally extending frame members and a pair of members transverse to said longitudinally extending frame members comprising a front and a rear frame member, the improvement comprising a pair of tow bar supporting members secured to said frame, each of said tow bar supporting members having spaced-apart connecting means formed along the length thereof, a tow bar comprising two pairs of arms joined at one end of each pair of arms, each of the free ends of said two pairs of arms being freely pivotally secured respectively in a selected one of said connecting means in each said tow bar supporting member, each of the pairs of arms at the junctures thereof being connected to opposite end portions of a vertically extending bearing means, coupling means rotatably mounted on said vertically extending bearing means intermediate said connections of said pairs of arms to said bearing means, said coupling means having receiving means adapted to receive for releasable securement an end of an implement attachment, and flexible means proximate the juncture of one of said pairs of arms and intermediate said free ends of said one of said pairs of arms and said pair of rear wheels for selectively varying the division of the vertical force at said juncture of said pairs of arms of said tow bar as between said pair of rear wheels and said pair of front wheels.

9. A vehicle as set forth in claim 8 wherein the free ends of each pair of arms are joined together for pivotal attachment to each said tow bar supporting member.

10. A vehicle as set forth in claim 8 wherein said bearing means comprises a vertically extending pin and the coupling means comprises a housing mounted on said pin for rotation about the axis of said pin.

11. In a multi-purpose vehicle comprising a generally rectangular frame supported by a pair of front wheels and a pair of rear wheels, each of said wheels adapted to be driven an steered, said frame having a pair of longitudinally extending frame members and a pair of frame members transverse to said longitudinally extending frame members comprising a front and a rear frame member, at least three of said frame members having a torsionally resilient construction, the improvement comprising spaced-apart connecting means formed in each of said longitudinally extending frame members along the length thereof, a tow bar having at least one pair of arms joined at one end of each arm, each of the free ends of said arms being freely pivotally secured respectively in a selected one of said connecting means in each of said longitudinally extending frame members, and flexible means proximate the juncture of said pair of arms and intermediate said free ends of said pair of arms and said pair of rear wheels for selectively varying the division of the vertical force at said juncture of said pair of arms of said tow bar as between said pair of rear wheels and said pair of front wheels.

12. A vehicle as set forth in claim 11 wherein said means selectively varying the division of the vertical force at said juncture of said pair of arms of said tow bar as between said pair of rear wheels and said pair of front wheels comprises a chain connected between said tow bar proximate said juncture and said frame whereby when said tow bar pulls an object thereby creating a tongue load having a vertical component of force, at least a portion of said vertical component of force is carried by said chain and transferred to said pairs of front and rear wheels and when obstacles are traversed by said vehicle whereby said tow bar is tensioned to release at least a portion of said vertical component of force on said chain said portion of said vertical component of force is transferred through the said free ends of said arms whereby the vertical component of force on said pair of front wheels is increased.

13. In a multi-purpose vehicle comprising a generally rectangular frame supported by a pair of front wheels and a pair of rear wheels each of said wheels adapted to be driven and steered, said frame having a pair of longitudinally extending frame members and a pair of frame members transverse to said longitudinally extending frame members comprising a front and a rear frame member, at least three of said frame members having a torsionally resilient construction, the improvement comprising spaced-apart connecting means formed in each of said longitudinally extending frame members along the length thereof, a tow bar comprising two pairs of arms joined at one end of each pair of arms, each of the free ends of said two pairs of arms being freely pivotally secured respectively in a selected one of said connecting means in each of said lontitudinally extending frame member, each of the pairs of arms at the junctures thereof being connected to opposite end portions of a vertically extending bearing means, coupling means rotatably mounted on said vertically extending bearing means intermediate said connections of said pairs of arms to said bearing means, said coupling means having receiving means adapted to receive for releasable securement an end of an implement attachment, and flexible means proximate the juncture of one of said pairs of arms and intermediate said free ends of said one of said pairs of arms and said pair of rear wheels for selectively varying the division of the vertical force at said juncture of said pairs of arms of said tow bar as between said pair of rear wheels and said pair of front wheels.

14. A vehicle as set forth in claim 13 wherein the free ends of each pair of arms are joined together for pivotal attachment to one of said pair of said longitudinally extending frame members.

15. A vehicle as set forth in claim 13 wherein said bearing means comprises a vertically extending pin and the coupling means comprises a housing mounted on said pin for rotation about the axis of said pin.

16. In a multi-purpose vehicle comprising a generally rectangular frame supported by a pair of front wheels and a pair of rear wheels, each of said wheels adapted to be driven and steered, said frame having a pair of longitudinally extending frame members and a pair of frame members transverse to said longitudinally extending frame members comprising a front and a rear frame member, at least three of said frame members having a torsionally resilient construction, the improvement comprising a pair of tow bar supporting members secured to said frame, each of said tow bar supporting members having spaced-apart connecting means formed along the length thereof, a tow bar having at least one pair of arms joined at one end of each arm, each of the free ends of said arms being freely pivotally secured respectively in a selected one of said connecting flexible means in each of said tow bar supporting members, and means proximate the juncture of said pairs of arms and intermediate said free ends of said pair of arms and said pair of rear wheels for selectively varying the division of the vertical force at said juncture of said pair of arms of said tow bar as between said pair of rear wheels and said pair of front wheels.

17. A vehicle as set forth in claim 16, wherein said means for selectively varying the division of the vertical force at said juncture of said pair of arms of said tow bar as between said pair of rear wheels and said pair of front wheels comprises a chain connected between said tow bar proximate said juncture and said frame whereby when said tow bar pulls an object thereby creating a tongue load having a vertical component of force, at least a portion of said vertical component of force is carried by said chain and transferred to said pairs of front and rear wheels and when obstacles are traversed by said vehicle whereby said tow bar is tensioned to release at least a portion of said vertical component of force on said chain said portion of said vertical component of force is transferred through the said free ends of said arms whereby the vertical component of force on said pair of front wheels is increased.

18. In a multi-purpose vehicle comprising a generally rectangular frame supported by a pair of front wheels and a pair of rear wheels each of said wheels adapted to be driven and steered, said frame having a pair of longitudinally extending frame members and a pair of members transverse to said longitudinally extending frame members comprising a front and a rear frame member, at least three of said frame members having a torsionally resilient construction, the improvement comprising a pair of tow bar supporting members secured to said frame, each of said tow bar supporting members having spaced-apart connecting means formed along the length thereof, a tow bar comprising two pairs of arms joined at one end of each pair of arms, each of the free ends of said two pairs of arms being freely pivotally secured respectively in a selected one of said connecting means in each said tow bar supporting member, each of the pairs of arms at the junctures thereof being connected to opposite end portions of a vertically extending bearing means, coupling means rotatably mounted on said vertically extending bearing means intermediate said connections of said pairs of arms to said bearing means, said coupling means having receiving means adapted to receive for releasable securement an end of an implement attachment, and flexible means proximate the juncture of one of said pairs of arms and intermediate said free ends of said one of said pairs of arms and said pair of rear wheels for selectively varying the division of the vertical force at said juncture of said pairs of arms of said tow bar as between said pair of rear wheels and said pair of front wheels.

19. A vehicle as set forth in claim 18 wherein the free ends of each pair of arms are joined together for pivotal attachment to each said tow bar supporting member.

20. A vehicle as set forth in claim 18 wherein said bearing means comprises a vertically extending pin and the coupling means comprises a housing mounted on said pin for rotation about the axis of said pin.

* * * * *